No. 615,628. Patented Dec. 6, 1898.
A. MONELL.
STAY BOLT.
(Application filed May 27, 1898.)
(No Model.)
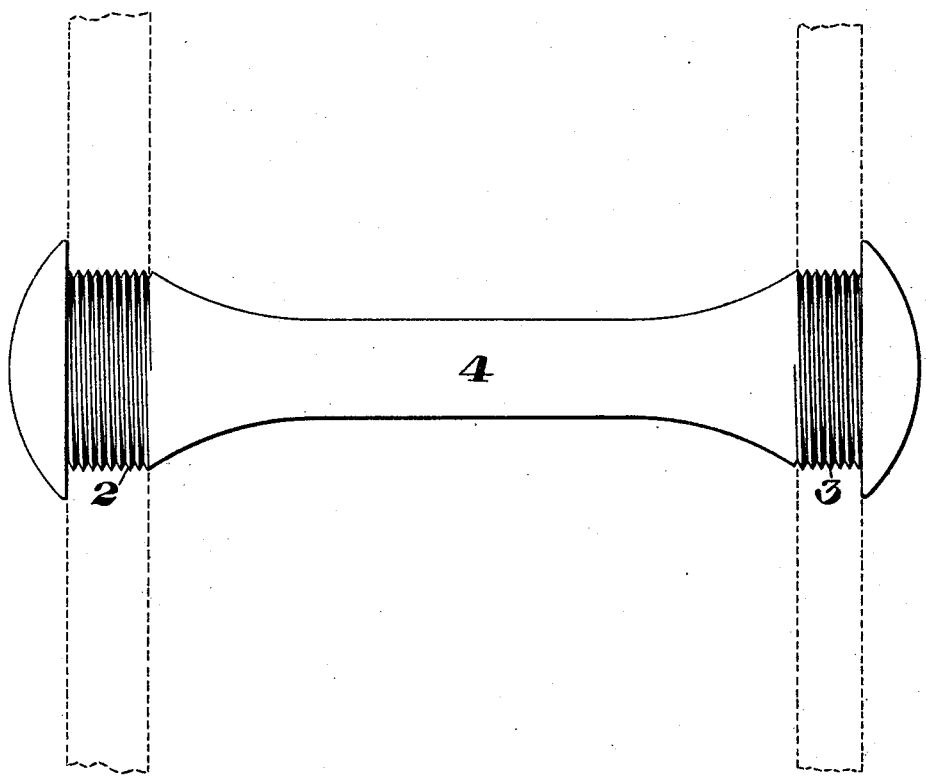
WITNESSES
INVENTOR

UNITED STATES PATENT OFFICE.

AMBROSE MONELL, OF HOMESTEAD, PENNSYLVANIA.

STAY-BOLT.

SPECIFICATION forming part of Letters Patent No. 615,628, dated December 6, 1898.

Application filed May 27, 1898. Serial No. 681,873. (No model.)

*To all whom it may concern:*

Be it known that I, AMBROSE MONELL, of Homestead, in the county of Allegheny and State of Pennsylvania, have invented a new and useful Improvement in Stay-Bolts, of which the following is a full, clear, and exact description, reference being had to the accompanying drawing, which shows in large section a stay-bolt constructed in accordance with my invention and applied to a fire-box.

The purpose of my invention is to provide a stay-bolt for the fire-boxes of locomotives, &c., and for attaching armor-plate to its backing and for other like purposes which shall be stronger and cheaper than any heretofore made.

It consists of a bolt having at each end a threaded head portion 2 3 and an intermediate shank 4 of less diameter than the head portion. The bolt is rolled or forged and the shank 4 is made of reduced diameter by the compression and reducing action of the rolls or forging press or hammer. In this way a very hard tough skin is imparted to the bolt, which is caused thereby to possess great strength and capacity to resist the shocks and vibrations to which it is put when in use, whereas if the reduced shank were formed by cutting the bolt in a lathe or other cutting apparatus such hard skin would not be present and the surface would have tool-marks, furnishing easy starting-points for fracture.

A stay-bolt like that shown in the drawing, having the hard skin produced by rolling or forging, has, I believe, twenty per cent. greater strength than a similar bolt having a machined surface.

The shape of the bolt, which is shown in the drawing—namely, the reduced shank and the larger head portion—is important, because by means of this section the strain is distributed throughout the bolt, less material is used, and a cheaper and better finished product is obtained than any which has heretofore been made.

I claim—

A stay-bolt having at its ends heads 2, 3, and an intermediate reduced portion 4 having a compacted outer skin or surface such as is produced by rolling or forging, substantially as described.

In testimony whereof I have hereunto set my hand.

AMBROSE MONELL.

Witnesses:
THOMAS W. BAKEWELL,
F. E. GAITHER.